3,057,726
METHOD AND APPARATUS FOR THE CONTINUOUS FILTRATION OF BREWERS' MASH
David Teignmouth Shore, Banstead, Surrey, England, assignor to The A.P.V. Company Limited, Crawley, Sussex, England
Filed Oct. 5, 1959, Ser. No. 844,573
Claims priority, application Great Britain Oct. 7, 1958
6 Claims. (Cl. 99—52)

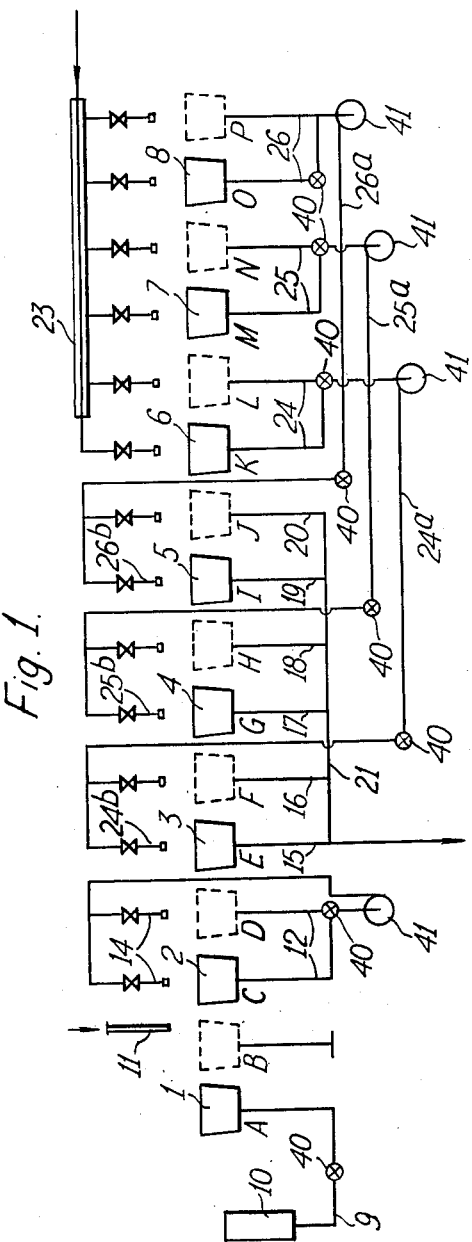

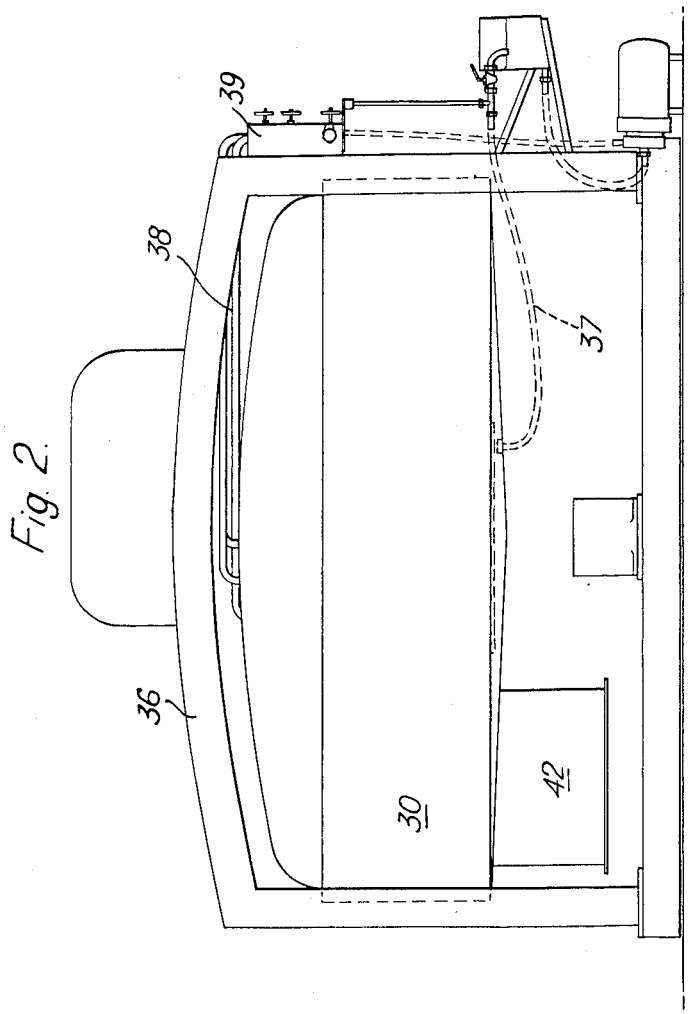

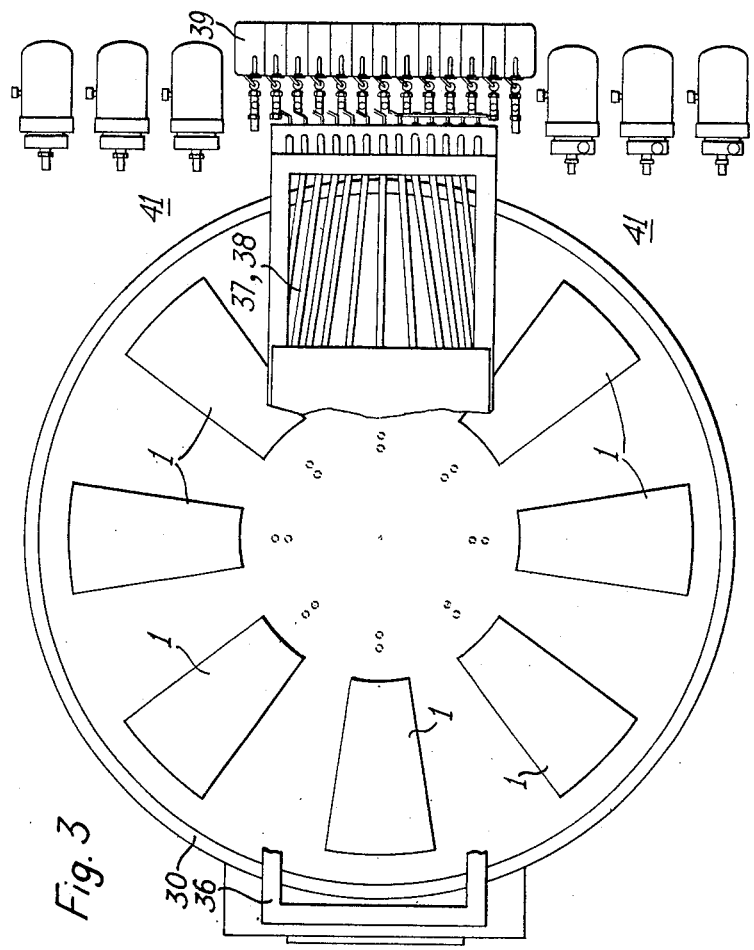

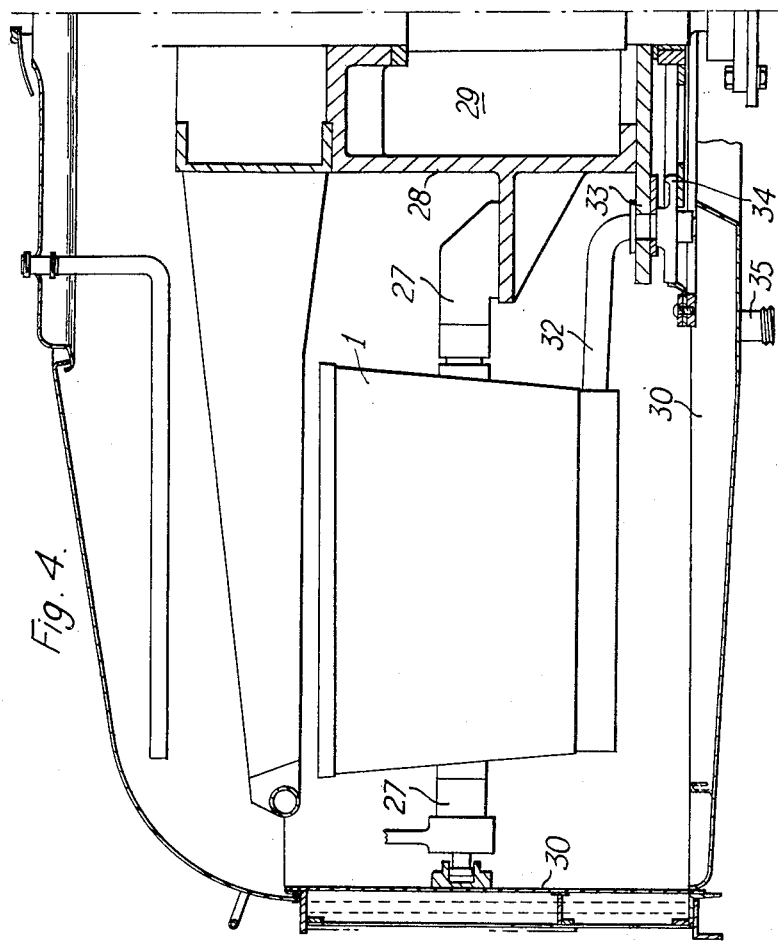

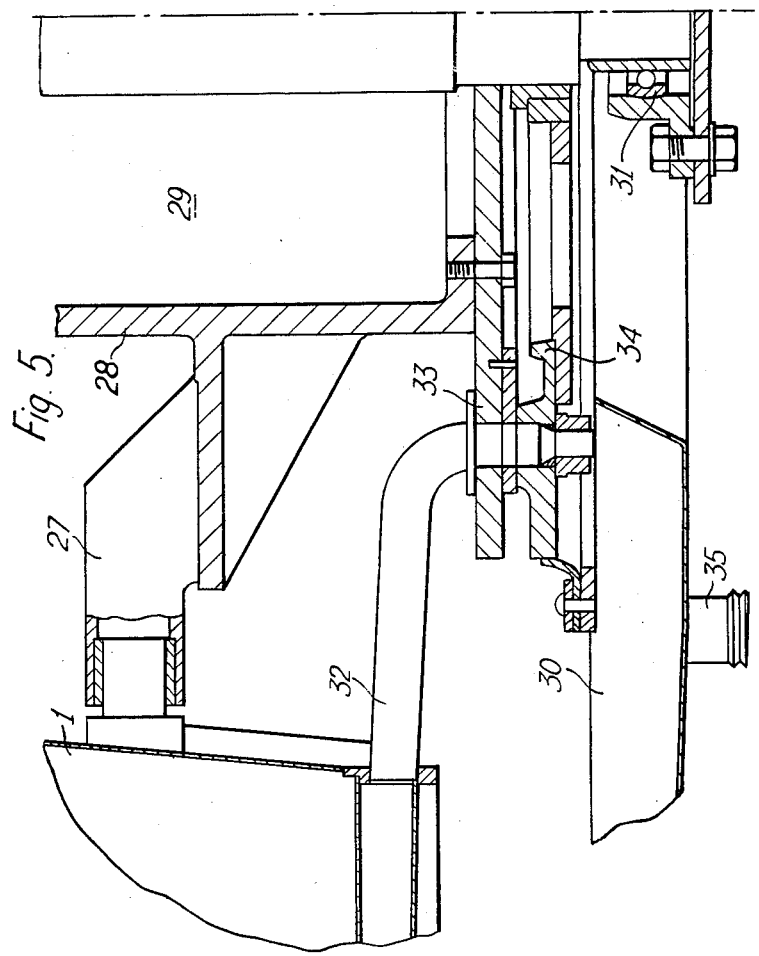

This invention concerns the continuous filtration of brewers' mash.

In the normal batch operation of conventional mashing filtration of the brewers' mash is effected within the mash tun by using the grain bed as a filter medium. The object of the present invention is to provide a continuous mashing process such that, as in the case of batch operation, the grain bed may be used as a filter medium whereby a "gin clear" bright wort may be obtained.

In operating any form of mash tun where the sweet wort is extracted and leached from the grain, it is essential that the rate of flow through the bed and the differential pressure across the bed is controlled. Excessive pressures cause a compacting, while excessive flow rates entrain unwanted solid material with the wort. Furthermore, since the composition of the wort changes during the period of run-off, then it is often necessary to modify the differential pressure and the flow rate. The present invention overcomes this problem by allowing individual control over each filter stage which can be varied during the operation by the brewer to allow for changes in malt composition, variations in the malt grind and changes occurring during the mashing.

According to the present invention a charge of mash is fed to a container which is moved through a number of treatment stages in succession, the various stages being set to subject the mash to the required different actions using the grain in the charge of mash as a filter bed. As the action of the container is similar to that of the mash tun, the term mash tun will be used in what follows.

In this way, a continuous filtration action can be set up by using a number of mash tuns which follow one another in succession through the various stages of treatment. The mash tuns would in a final stage be evacuated of the spent grain in readiness for their presentation to receive a fresh charge of mash and so one, the treatment thus proceeding continuously as is required.

The method of the invention can be carried into practical effect in various ways: thus a series of mash tuns can be coupled to one another so as to move together in a closed looped path along which the apparatus for carrying out the various stages of treatment, are disposed, the wort out-put resulting from the treatment in the various stages regarded from the aspect of each charge of mash being collected and passed on for further treatment.

The closed looped path can be of various forms but in general a circular path in a horizontal plane would be the most convenient, the supply connection for the mash, the supply discharge and re-circulating devices for sparging liquid and so on being angularly spaced in the circular path and being controlled by valves which are operated in synchronism with (and in some cases by) the movement of the mash tuns in the circular path.

Indeed the method is readily adaptable for an entirely automatic control the various stages in which are set into action automatically as the mash tuns move into position in succession for the various treatments.

It will be clear that the grain in the mash tuns remain therein during a complete cycle of operations to form the bed which is so necessary for obtaining bright clear wort and so the recognised practise regularly followed in the use of the batch operation is adapted by this invention to the requirements of the more modern continuous production of brewers' wort in which the wort is in continuous movement from the mashing stage to the final fermentation stage.

The invention is illustrated in the accompanying drawings in which FIG. 1 is a diagrammatic development of the path through which a number of mash tuns move, in following one another through a number of operating stages. FIGS. 2–5 are views of a practical form of apparatus for carrying the method shown in FIG. 1 into practical effect, FIGURE 2 being a side elevation of the apparatus, FIG. 3 a plan view thereof, FIG. 4 a radial section of the apparatus and FIG. 5 a fragmentary radial section to a larger scale than that of FIG. 4.

Referring firstly to FIG. 1 the references 1–8 indicate mash tuns which are coupled together to move in succession, one following another through various operating stations amounting to 16 in all, the various stages being indicated by the references A–P: the mash tuns follow one another through the various stages by movement in a closed looped path, the stage P being the final stage of the stages A–P, whereafter the mash tuns move again into stage A for the next cycle of operations.

The various stages A–P correspond to those commonly used in the production of wort but in a static mash tun. Thus the stages could be as follows for any one of the tuns 1–8 the sequence being followed in respect of the mash tun marked 1.

For ease of understanding the various actions, the vessels have been shown in full lines in the stages, A, C, E, G, I, K, M, O and in dotted lines in the intervening stages.

At stage A the empty mash tun 1 is prefilled with water through a pipe 9 including a pump which draws the supply from a supply tank 10. The mash tun then passes on to stage B at which the prefilled tun is charged with mash via the pipe 11: about one-half of the charge is supplied at this stage. The mash tun now passes to stage C in which the remainder of the mash charge is supplied via the pipe 11: in this stage also the mash tun is connected via the pipe 12 to a first wort trough, the liquor then being re-circulated by being returned to the holder 1 via the first sparge pipe 14.

The feed to the mash tun is completed at stage C: the tun next passes to stage D in which it is clear of the pipe 11 but still connected in circuit with the pipes 12, 14 to continue the re-circulation of the mash.

The mash tun now passes in succession to stages E–J in which the wort is drawn from the tun as strong wort which is collected from the tun in those stages by pipes 16–20 and collected for discharge via pipes 21, 22 to a wort trough (not shown).

Having passed through stages E–J, the wort remaining in the mash tun is weak wort; in passing now to stages K–P in succession, the tun passes under sparge pipes 23 to which a fresh water supply is taken: in these various stages, sparged weak liquor is collected by pipes 24, 25, 26 respectively as 3rd, 2nd, and 1st wort sparges which are respectively taken by pipes 24ª 25ª and 26ª to discharge heads 24ᵇ, 25ᵇ and 26ᵇ over the holder 1 while in positions E, F and G, H and I J.

After the action in stage P, the mash tun returns to stage A: in the first part of this stage the vessel 1 is overturned to discharge the grain residue and is flushed out by water supplied by pipe 9, the holder then being uprighted to commence the cycle as it has been described.

The action in one complete cycle has been described with respect of only one mash tun 1: the other mash tuns 2–8 will follow the same sequence as appears from FIGURE 1 in which the various mash tuns are at any one time respectively undergoing the action of one or other stage. In the result therefore the overall action on the wort flow is a continuous one.

Reference will now be made to FIGURES 2–5 of the drawings which shows one form of apparatus: in FIGURE 3 the various mash tuns 1–8 are so referenced: in FIGURES 4 and 5 however only one tun is indicated it being understood that the other tuns are similar. The mash tuns are arranged in a circular series on a carrier frame 28; each vessel is provided with spigots carried in bearings 27 on a frame 28 which is mounted on a central spindle 29, the frame being supported at its perimeter by a fixed housing 30 having bearings 31 supporting the spindle 29.

The various mash tuns have their base openings connected by pipes 32 to openings in a face valve ring 33 which moves with the carrier frame 28: this valve ring moves over a static valve ring 34 having a ring of openings to which the various pipes corresponding to the pipes 9, 12, 15, 20 and 24–26 referred to in FIG. 1 are taken via connectors of which only one is shown at 35 in FIG. 4. The connections are disposed as is shown in FIG. 3 in a circle about the axis of rotation of the carrier frame 28 so that as the openings in the valve ring 33 move into register successively with the openings in the static ring 34 the mash tuns are connected at their discharge side as has been described with reference to FIG. 1.

The overhead supply of charge, water and liquor to the mash tuns as has been described in the cycle of FIGURE 1 is achieved by supporting the requisite pipe lines by an overhead gantry 36.

The lower and upper groups of pipes, indicated collectively by the references 37, 38, are taken to a control panel 39 by which the various flows can be separately regulated by control valves indicated at 40 in FIG. 1. Pumps indicated at 41 in FIG. 1 for establishing flow of liquor are indicated collectively in FIG. 3.

For the purpose of overturning the vessels when they arrive at stage A, the housing 30 is equipped with a control plate which (as the carrier frame 28 turns) turns over the vessels to cause the residue to fall out into a collecting chute 42, the plate then returning the vessel which was over-turned to its normal position in readiness for the commencement of the operating cycle as described.

The drive to the carrier 28 can be any convenient power drive such as by an electric motor or by a pneumatic motor: the power drive can be controlled by a timing device located in the control panel 39 and this device can be adjustable to enable any desired pattern of control to be effected automatically.

I claim:

1. In the continuous production of brewers' wort the method which comprises the steps of preparing malt charges in succession and in spaced relationship, in moving the prepared charges to a number of operating stations which are spaced apart so that at any one time a number of charges proceed from station to station, in supplying regulated quantities of process liquor consisting of water containing matter extracted by the water from mash grain, separately to the malt charges in register with the various stations, in causing the liquor to pass by a natural gravity flow through the charges, in separately collecting the filtered liquor passing from the various charges, and controlling the liquid pressure difference across the charges by regulating the level of liquid associated with each charge and allowing the process liquor to pass by free gravity flow from the charges.

2. In the continuous production of brewers' wort the method which comprises the steps of preparing malt charges in succession and in spaced relationship, in moving the prepared charges to a number of operating stations which are spaced apart so that at any one time a number of charges are in register with a number of stations and so that the charges proceed from station to station, in supplying regulated quantities of process liquor consisting of water containing matter extracted by the water from mash grain, separately to the malt charges in register with the various stations, in controlling the liquid pressure difference across the charges by regulating the level of liquid associated with each charge and allowing the process liquor to pass by free gravity flow from the charges.

3. Mechanism for use in the continuous productions of sweet brewers' wort, including a carrier, a series of mash tuns mounted in spaced relationship on the carrier, means to move the carrier to advance the mash tuns repeatedly through a closed looped path, a stationary device for supplying malt, a number of stationary devices for supplying and withdrawing process liquor consisting of water containing matter extracted by the water from mash grain, the devices being spaced apart along the path so that the mash tuns are carried in succession to receive a charge of malt, and to receive flows of process liquor through the charges, means to regulate individually the flow of process liquor at the stations, means to direct the flow of withdrawn wort selectively to a supply device for re-circulating the process liquor and to a discharge device and eject the spent mash from the tuns in readiness for a repeated cycle, including means to modify differential pressure and flow rate to regulate individually the flow of process liquor at the stations.

4. Mechanism for use in the continuous productions of sweet brewers', wort, including a carrier, a series of mash tuns mounted in spaced relationship on the carrier, means to move the carrier to advance the mash tuns repeatedly through a closed looped path, a stationary device for supplying malt, a number of stationary devices for supplying and withdrawing process liquor consisting of water containing matter extracted by the water from mash grain, the devices being spaced apart along the paths so that the mash tuns are carried in succession to receive a charge of malt, and to receive flows of process liquor through the charges, means to regulate individually the flow of process liquor at the stations, means to direct the flow of withdrawn wort selectively to a supply device for re-circulating the process liquor and to a discharge device and eject the spent mash from the tuns in readiness for a repeated cycle, wherein the carrier is supported for angular movement about a vertical axis and the mash tuns are disposed in angularly spaced relationship about that axis, the stationary devices being disposed in rings above and below the path of movement of the tuns.

5. Mechanism for use in the continuous productions of sweet brewers', wort, including a carrier, a series of mash tuns mounted in spaced relationship on the carrier, means to move the carrier to advance the mash tuns repeatedly through a closed looped path, a stationary device for supplying malt, a number of stationary devices for supplying and withdrawing process liquor consisting of water containing matter extracted by the water from mash grain, the devices being spaced apart along the paths so that the mash tuns are carried in succession to receive a charge of malt, and to receive flows of process liquor through the charges, means to regulate individually the flow of process liquor at the stations, means to direct the flow of withdrawn wort selectively to a supply device for re-circulating the process liquor and to a discharge device and eject the spent mash from the tuns in readiness for a repeated cycle, wherein the carrier is supported for movement by a fixed framework having ducts for the supply of mash, ducts for the supply of process liquor and ducts for the return of process liquor to the supply ducts and discharge ducts, and wherein also the carrier is formed with ducts connected to the interior of the various mash tuns and terminating in valve controlled openings in the cooperating faces of one part of a valve which moves with the carrier and the other part of which is carried by the framework and is formed with openings terminating the return and discharge ducts.

6. Mechanism as claimed in claim 5 and wherein the ducts on the fixed framework are equipped with control valves, and wherein also the framework is equipped with a central valve control station for controlling the various valves as the carrier moves to advance the mash tuns from device to device.

References Cited in the file of this patent

UNITED STATES PATENTS

| | | |
|---|---|---|
| 2,840,459 | Karnofsky | June 24, 1958 |
| 2,894,841 | Compton et al. | July 14, 1959 |
| 2,961,316 | Cook et al. | Nov. 21, 1960 |